United States Patent
A'Harrah

(10) Patent No.: US 7,285,933 B2
(45) Date of Patent: Oct. 23, 2007

(54) METHOD AND APPARATUS FOR LOSS OF CONTROL INHIBITOR SYSTEMS

(75) Inventor: Ralph C. A'Harrah, Alexandria, VA (US)

(73) Assignee: United States of America as represented by the Administrator of the National Aeronautics and Space Administration, Washington, DC (US)

(*) Notice: Subject to any disclaimer, the term of this patent is extended or adjusted under 35 U.S.C. 154(b) by 259 days.

(21) Appl. No.: 11/188,227

(22) Filed: Jul. 20, 2005

(65) Prior Publication Data

US 2006/0284021 A1    Dec. 21, 2006

Related U.S. Application Data

(63) Continuation-in-part of application No. 10/975,119, filed on Oct. 27, 2004.

(60) Provisional application No. 60/515,215, filed on Oct. 28, 2003.

(51) Int. Cl.
*G05B 1/06* (2006.01)

(52) U.S. Cl. ............... 318/638; 318/560; 244/175; 244/195; 244/223

(58) Field of Classification Search ............ 244/175, 244/195, 223; 318/638, 560
See application file for complete search history.

(56) References Cited

U.S. PATENT DOCUMENTS

| | | | |
|---|---|---|---|
| 2,639,875 A | 5/1953 | Vogel | |
| 2,724,565 A | 11/1955 | Trevaskis | |
| 2,725,203 A | 11/1955 | Blatz et al. | |
| 2,736,518 A | 2/1956 | Degenfelder | |
| 2,780,427 A | 2/1957 | Keller et al. | |
| 2,783,006 A | 2/1957 | Greenland et al. | |
| 2,849,198 A | 8/1958 | Borngesser | |
| 2,864,571 A | 12/1958 | Creasey et al. | |
| 2,936,976 A | 5/1960 | Greenland et al. | |
| 4,595,158 A | 6/1986 | Robinson | |
| 4,599,070 A | 7/1986 | Hladky | |
| 5,062,594 A * | 11/1991 | Repperger | 244/175 |
| 5,573,088 A | 11/1996 | Daniels | |
| 5,691,898 A * | 11/1997 | Rosenberg et al. | 700/85 |
| 6,129,172 A * | 10/2000 | Yoshida et al. | 180/446 |
| 6,283,859 B1 | 9/2001 | Carlson | |
| 6,339,419 B1 | 1/2002 | Jolly | |
| 6,373,465 B2 | 4/2002 | Jolly | |
| 6,822,635 B2 * | 11/2004 | Shahoian et al. | 345/156 |

* cited by examiner

*Primary Examiner*—Rita Leykin
(74) *Attorney, Agent, or Firm*—Helen M. Galus

(57) ABSTRACT

Active and adaptive systems and methods to prevent loss of control incidents by providing tactile feedback to a vehicle operator are disclosed. According to the present invention, an operator gives a control input to an inceptor. An inceptor sensor measures an inceptor input value of the control input. The inceptor input is used as an input to a Steady-State Inceptor Input/Effector Output Model that models the vehicle control system design. A desired effector output from the inceptor input is generated from the model. The desired effector output is compared to an actual effector output to get a distortion metric. A feedback force is generated as a function of the distortion metric. The feedback force is used as an input to a feedback force generator which generates a loss of control inhibitor system (LOCIS) force back to the inceptor. The LOCIS force is felt by the operator through the inceptor.

21 Claims, 5 Drawing Sheets

METHOD AND APPARATUS FOR LOSS OF CONTROL INHIBITOR SYSTEMS

CROSS-REFERENCE TO RELATED APPLICATION

This application is a continuation-in-part of application Ser. No. 10/975,119, filed Oct. 27, 2004, which is hereby incorporated by reference in its entirety, application Ser. No. 10/975,119 claims the benefit of provisional Application No. 60/515,215, filed Oct. 28, 2003, which is hereby incorporated by reference in its entirety.

ORIGIN OF INVENTION

The invention described herein was made by employees of the United States Government and may be manufactured and used by or for the Government of the United States of America for governmental purposes without the payment of any royalties thereon or therefor.

BACKGROUND OF THE INVENTION

1. Field of the Invention

The present invention relates to man-machine compatibility with respect to closed-loop control of vehicles. Specifically, the present invention relates to tactile feedback systems. More specifically, the present invention relates to an improved and intuitive tactile feedback to the vehicle operator on the status of the vehicle's controls that counters the current trend of utilizing control-by-wire and or power controls that greatly reduce the operator's "feel" for the limitations imposed on the control system by failures, configuration idiosyncrasies, seldom encountered and unanticipated operating conditions, and design limitations that can result in catastrophic loss of vehicle control.

2. Description of the Related Art

Many vehicle control systems use hydraulic, mechanical, or electrical power to augment the operator's control forces to reduce the operator's workload for maneuvering the vehicle. But the more work done by the power system, the less tactile information is being transmitted back through the inceptor to the operator on the status of the control system. For example, the operator will not detect the increase in control forces on a system in need of lubrication as readily because the power system is providing much of the additional force required. For large vehicles, such as commercial aircraft, there is further masking of information by the system compliance, the stretching of cables, the bending of the mounting brackets and push rods, and the over-travel springs on the actuator servo valves.

The latest advance in vehicle control technology to be widely implemented is the control-by-wire, which replaces the force transmitting mechanical linkage between the inceptor and the effector with a wire transmitting the inceptor generated electric signal commanding the effectors to action. A multitude of benefits are attributed to the adoption of control-by-wire technology, but the compromise was the acceptance that tactile feel for the status of the flight control system were either not needed, or could be provided through alternate sensory channels. One of the unanticipated consequences of replacing the mechanical linkage with wire, was the resulting incidences of operators, when unexpectedly encountering a life threatening situation, responding by moving their inceptors at such a rate that the effectors could not keep up, markedly increasing the phase delay between the inceptor input and the associated effector output. Phase delay is a key factor in the experiencing of loss of control associated with the aircraft-pilot or operator-vehicle coupling phenomena.

Loss of control from aircraft-pilot coupling is the result of the pilot trying aggressively to help the aircraft either recover from an upset, or to acquire a new flight path because of an impending threat on the original course. Under such circumstances, the pilot will choose to act like an additional stability augmentation system in order to more responsively acquire the desired flight path, and quickly dampen any overshoots resulting from the recovery maneuver. The consequences of the phase delay are that while the pilot's inceptor inputs are trying to enhance the stability, the resulting effector output may be doing just the opposite because of the phase delay.

The invention fills the void created by the adoption of control-by-wire technology in tactile feedback through the inceptor to the vehicle operator on the status of the critical functions of the vehicle control system.

"Loss of Control" was the single largest fatal accident category for the worldwide commercial jet fleet from 1994 through 2003, and has consistently been either the first or second largest fatal accident category since the beginning of accident data collection. Specific factors that cause loss of control are many and varied, but a common indicator for several recent aircraft accidents has been the lack of awareness by the pilot of anomalous behavior of the flight control system, caused by a control surface not following the pilot's commands to the level of accuracy needed to maintain control of the aircraft.

With the degree of technical sophistication involved in assuring that today's aircraft are easily controllable, with redundancy providing fail-safe operations even after one or two failures of key components, there continues to be room for improvement. Recent advances in flight control designs, such as fly-by-wire, have eliminated the pilot's tactile feel for a jammed or frozen control surface, or for hitting the control surface deflection stop. Generally, there is little or no restraining force on the cockpit inceptors to alert the pilot for exceeding the control surface rate limits. Such tactile feedback, which was an implicit pilot cue in early aircraft, is substantially eroded with the introduction of the fully powered hydro-mechanical control systems, and completely eliminated with the introduction of fly-by-wire control systems.

Other vehicle types are adapting control systems that utilize control-by-wire technology. The control-by-wire (CBW) control systems, when used as part of the vehicle's primary maneuver controls, are subject to the same challenges that have been experienced in air vehicles. For example, the loss of tactile feedback to the operator on deteriorating conditions of the control system and the anticipated vehicle response, which can lead to loss of control unless appropriately compensated for by the operator.

An approach to addressing the problems noted above is to provide the vehicle operator with tactile feedback on deteriorating conditions with the vehicle controls. Specifically, one way this can be accomplished is by providing increasing resistance to the inceptor proportional to the severity of the deterioration, the vehicle operator will initially be alerted by the increased resistance felt during control application, with the resistance ultimately increasing to thereby maintain safe control of the vehicle.

There have been attempts to address the problems noted above. For example, U.S. Pat. No. 6,339,419, issued to Jolly et al., refers to a magnetically controllable system. In Jolly '419, a haptic interface system using force feedback and a magnetically-controllable device that provides resistance forces opposing joystick movement is disclosed. The system includes a computer system that runs a program similar to a computer game that can use a joystick which is similar to that which is used in an aircraft. The joystick is in contact with a pilot or an operator and the haptic interface device which is in contact with the controller provides resistance to the operator's motion. The computer system provides a variable output signal corresponding to a feedback force and the magnetically controllable device varies the feedback force based on the output signal. The feedback force is varied by changing the density of the magnetically controlled fluid in response to the output signal. Similarly, U.S. Pat. No. 6,373,465, issued to Jolly et al., discloses a magnetically controllable device adapted for use in a feedback computer system to provide force feedback sensations to the system's operator. The system in Jolly '465 includes a computer system that runs a program which controls a haptic interface device, similar to a joystick in an aircraft.

U.S. Pat. No. 6,283,859, issued to Carlson et al., discloses a feedback system using a magnetically controllable haptic interface system wherein a magnetically controllable fluid is employed in the device. Carlson '859 is directed to providing computer game operators with "feel sensations" so they can get a realistic simulation of the computerized game. According to Carlson, a variable resistance force in proportion to the strength of an applied magnetic field is provided.

U.S. Pat. No. 5,062,594, issued to Repperger, discloses a flight control system with tactile feedback. In Repperger '594 there is a roll system which has visual feedback and includes a feedback system which provides feel derived from signal sources. Repperger '594 uses an algorithm which is characterized mathematically. The control system in Repperger '594 is a passive control system, wherein feedback forces are based on the pilot input to the flight control system.

Lastly, U.S. Pat. No. 4,599,070, issued to Hladky et al., discloses a method and system apparatus for simulating a control system, such as an aircraft control system. According to Hladky '070 a moveable control is simulated in which force and movement parameters of the control can be varied in accordance with simulated operation of the system. Feedback feel is accomplished through the use of levers having an adjustable fulcrum. The control system in Hladky '070 is a programmed passive system, wherein forces are simulated based on the programmed set of simulated conditions.

There remains a need for a tactile feedback system that can alert the operator, through tactile feedback generated by increasing the friction force on the inceptor as a function of the severity of potential loss of control conditions. Furthermore, there remains a need for a tactile feedback system that can produce a restraining force to counter operator vehicle coupling loss of control conditions. Thus, it would be advantageous to provide an improved tactile feedback system that can alert the operator, through tactile feedback generated by increasing the friction force on the inceptor as a function of the severity of potential loss of control conditions. It would also be advantageous to provide an improved tactile feedback system that can produce a retaining force to counter operator vehicle coupling loss of control conditions.

SUMMARY

In view of the deficiencies described above, it is an object of the present invention to provide an improved tactile feedback system that can alert the operator, through tactile feedback generated by increasing the friction force on the inceptor as a function of the severity of potential loss of control condition. It is a further objective to provide an improved tactile feedback system that can produce a restraining force to counter operator vehicle coupling loss of control conditions.

It is a further objective of the present invention to alert the operator, through tactile feedback generated by increasing the friction force on the inceptor as a function of the severity of the condition, where the loss of control conditions can include, but are not limited to, displacement and rate limiting of the effector; misrigging, or misalignment of the inceptor to effector relationship; motion limiting increase in resistance of the effector, which is not reflected at the inceptor; a deterioration of control/response harmony as a result of actuation of a safety-enhancing/envelope-limiting system; a deterioration of control/response harmony as a result of unanticipated degradation of the control system under unexpected operating conditions; aggressive inceptor inputs by the operator, which are outside the design-operating envelope of the control system, and would result in a potential loss of control; inceptor inputs by the operator, which are outside the safe-operating envelope of the control system as a result of a failure/degradation in power system driving, the effector, and would result in a potential loss of control. The criticality of these conditions is appropriately reflected by a difference between an anticipated effector response to an inceptor input and the actual effector response.

The present invention includes active and adaptive systems and methods to prevent loss of control accidents and incidents by providing advisory information via tactile feedback to a vehicle operator on the status of the vehicle's control functions for a broad range of debilitating conditions.

According to the present invention, an operator gives a control input to an inceptor. An inceptor sensor measures a value, inceptor input, of the control input. The inceptor input is used as an input to a Steady-State Inceptor Input/Effector Output Model that models the vehicle control system design.

The model is used to generate a desired effector output from the inceptor input. The desired effector output is compared to an actual effector output. Actual effector output is measured by an effector sensor.

A distortion metric is generated from the comparison of the desired effector output to the actual effector output. A feedback force is determined from an evaluation of the distortion metric. Generally, the feedback force is a function of the distortion metric. The feedback force is used as an input to a feedback force generator which generates a loss of control inhibitor system (LOCIS) force back to the inceptor. The LOCIS force is felt by the operator through the inceptor.

Other features and advantages of the invention will be apparent from the following detailed description taken in conjunction with the following figures, wherein like reference numerals represent like features.

DETAILED DESCRIPTION OF THE INVENTION

Figure 1:
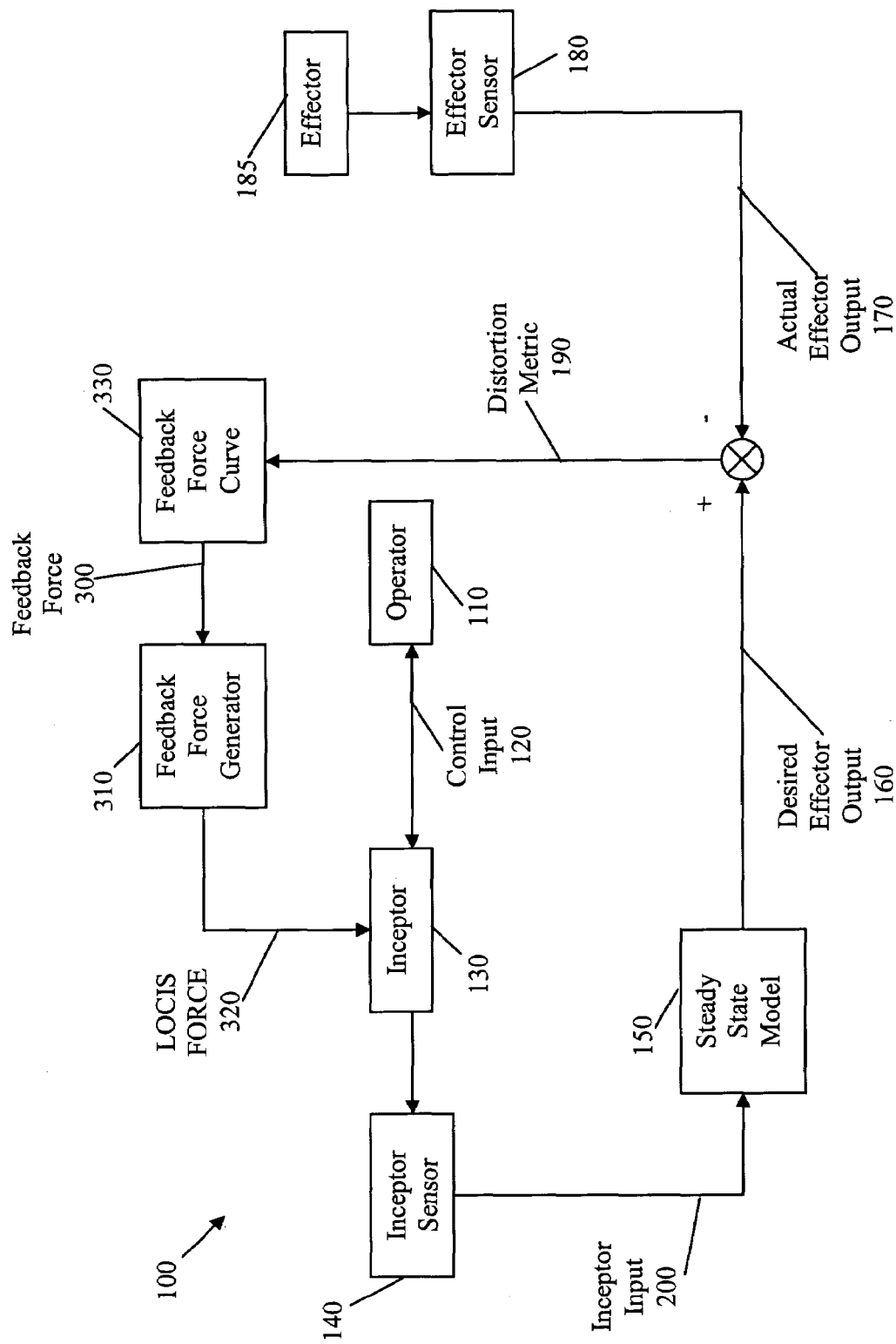
FIG. 1 shows a loss of control inhibitor system according to the present invention in block diagram form.

While this invention is susceptible of embodiments in many different forms, there are shown in the drawings and will herein be described in detail, preferred embodiments of the invention with the understanding that the present disclosure is to be considered as an exemplification of the principles of the invention and is not intended to limit the broad aspect of the invention to the embodiments illustrated.

The present invention includes active and adaptive systems and methods to prevent loss of control accidents and incidents by providing advisory information via tactile feedback to a vehicle operator on the status of the vehicle's control functions for a broad range of debilitating conditions. Vehicles incorporating control-by-wire, that is, the inceptor's input command signal to the effector is sent by other than mechanical means, are generally void of any tactile feedback through the inceptor regarding control anomalies, and therefore have the most to gain from application of the invention.

FIG. 1 shows a loss of control inhibitor system according to the present invention in block diagram form. In the system 100, an operator 110 gives a control input 120 to an inceptor 130. An inceptor sensor 140 measures a value, inceptor input, $\delta_I$, 200, of the control input 120. In various preferred embodiments, the inceptor sensor 140 measures inceptor 130 position and or inceptor 130 rate. The inceptor input 200 is used as an input to a Steady-State Inceptor Input/Effector Output Model (the Model) 150, that models the vehicle control system design.

Figure 2:
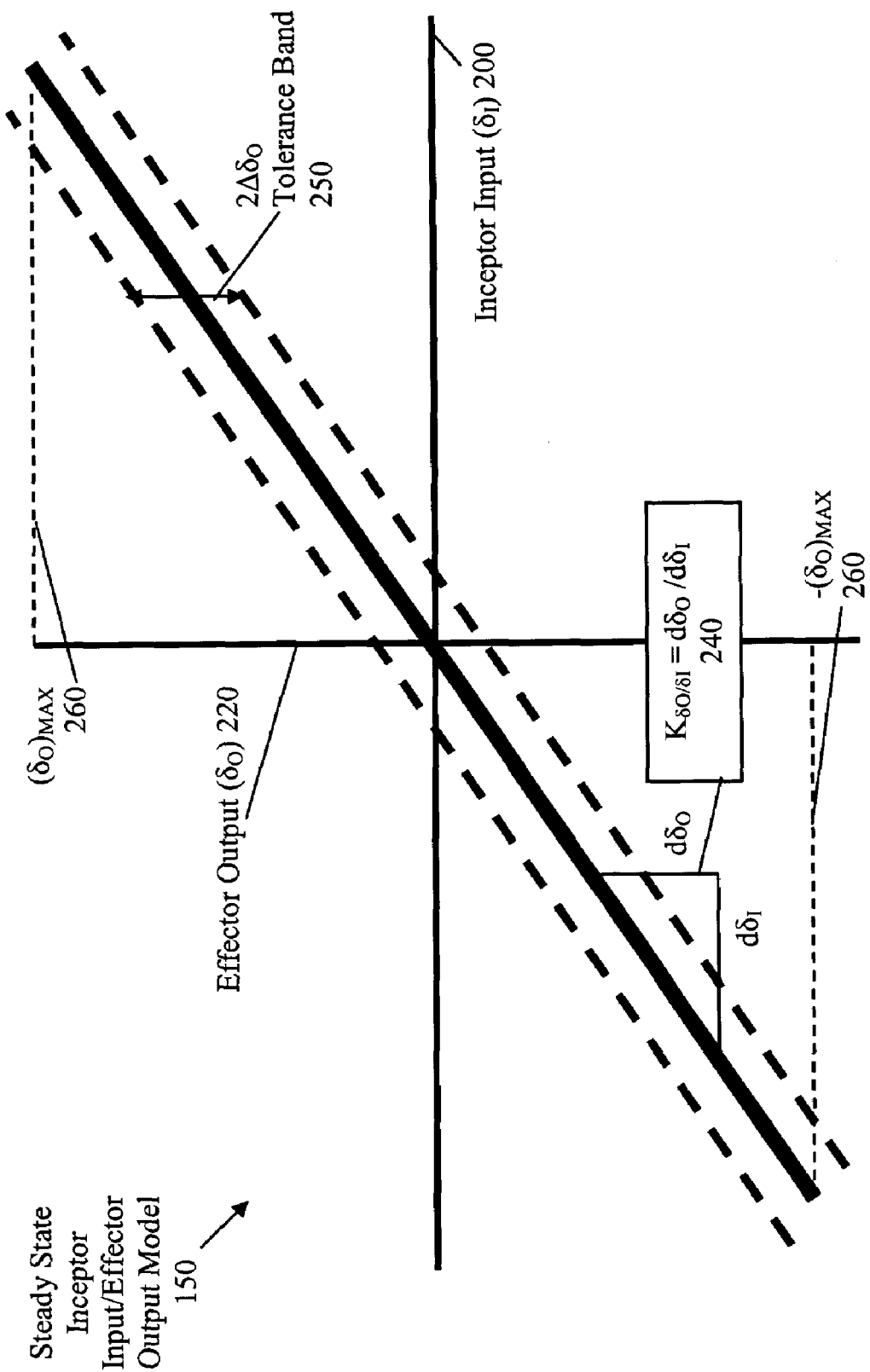
FIG. 2 shows a Steady-State Inceptor Input/Effector Output Model according to the present invention.

The Model 150 is defined by the vehicle control system team. Typically, the Model 150 is based on prior design experience, man-machine studies, simulations, and prototype tests. FIG. 2 shows a Steady-State Inceptor Input/Effector Output Model according to the present invention. The Model 150, shown in FIG. 2, shows inceptor input, $\delta_I$, 200 on the horizontal axis 210 and effector output, $\delta_O$, 220 on the vertical axis 230. An effector to inceptor design gain, $K_{\delta O/\delta I}$, 240 can be defined as change in effector output 220 divided by the change in inceptor input 210, or $d\delta_O/d\delta_I$. A tolerance band, $\Delta\delta_O$, 250 can be defined as a range of allowable effector outputs 220 for a given inceptor input 200. Maximum effector output, $(\delta_O)_{MAX}$, 260 is also shown. Other forms for model 150 may also be used. For example, the model 150 may include data look up tables or other formulas, equations, or other suitable modeling techniques known in the art.

Returning to FIG. 1, the Model 150 is used to generate a desired effector output, $(\delta_O)_D$, 160 from the inceptor input 200. The desired effector output 160 is compared to an actual effector output, $(\delta_O)_A$, 170. Actual effector output 170 is measured by an effector sensor 180. In various preferred embodiments, effector sensor 180 measures effector 185 position and/or effector 185 rate.

Under normal operations, the inceptor input 200 and effector output 220 values will lay within the tolerance band 250 of the Steady-State Inceptor Input/Effector Output Model 150, resulting in a distortion metric value, E, 190 that will provide no additional feedback to the operator 110 from the subject invention. However, degradation in the control system 100 integrity and or levels of inceptor 130 activity under circumstances not envisioned during the design and development phase of the vehicle, which cause the inceptor input 200 and or effector output 220 values to exceed the tolerance band 250 of the Steady-State Inceptor Input/Effector Output Model 150, will result feedback to the operator 110 from the subject invention.

Generally, the difference between the desired effector output 160 and the actual effector output 170 is the value of the distortion metric, E, 190, which, with the force feedback curve, sets the magnitude of the tactile feedback through the inceptor to the operator. The distortion metric, E, 190 is generated from the comparison of the desired effector output 160 to the actual effector output 170. A feedback force, $F_d$, 300 is determined from an evaluation of the distortion metric 190. Generally, the feedback force 300 is a function of the distortion metric. In a preferred embodiment, the distortion metric 190 and the feedback force 300 can be determined as follows:

$$\text{If } \delta_I K_{\delta O/\delta I} + \Delta\delta_O > (\delta_O)_A > \delta_I K_{\delta O/\delta I} - \Delta\delta_O, \text{ then } E=0 \quad (1)$$

$$\text{If } \delta_I K_{\delta O/\delta I} + \Delta\delta_O \leq (\delta_O)_A \leq \delta_I K_{\delta O/\delta I} - \Delta\delta_O, \quad (2)$$

then determine E, where:

$$E=[(\delta_I K_{\delta O/\delta I} - \Delta\delta_O) - (\delta_O)_A]/(\delta_O)_{MAX}, \text{ for } (\delta_O)_A \leq \delta_I K_{\delta O/\delta I} - \Delta\delta_O, \text{ or}$$

$$E=[(\delta_O)_A - (\delta_I K_{\delta O/\delta I} + \Delta\delta_O)]/(\delta_O)_{MAX}, \text{ for } (\delta_O)_A \geq \delta_I K_{\delta O/\delta I} + \Delta\delta_O, \text{ then}$$

$$F_d = f(E), \quad (3)$$

where f(E) is a predetermined feedback force curve 330 for the vehicle.

By using the distortion metric 190 as the input to the force feedback curve 330, the system 100 is an active and adaptive feedback control system. The system 100 can adapt to changes in the electro-mechanical linkages between the inceptor 130 and the effector 185. Furthermore, the system 100 actively compares desired effector output 160 to the actual effector output 170, which, in other words, compares what should be happening in the system 100 to what is actually happening in the system 100 and taking corrective measures when the two are sufficiently different.

Feedback force 300 is used as an input to a feedback force generator 310 which generates a loss of control inhibitor system (LOCIS) force 320 back to the inceptor 130. The LOCIS force 320 is felt by the operator 110 through the inceptor 130. The feedback force generator 310 can be of any type known in the art, including, but not limited to, the magnetically controllable devices discussed above.

Figure 3:
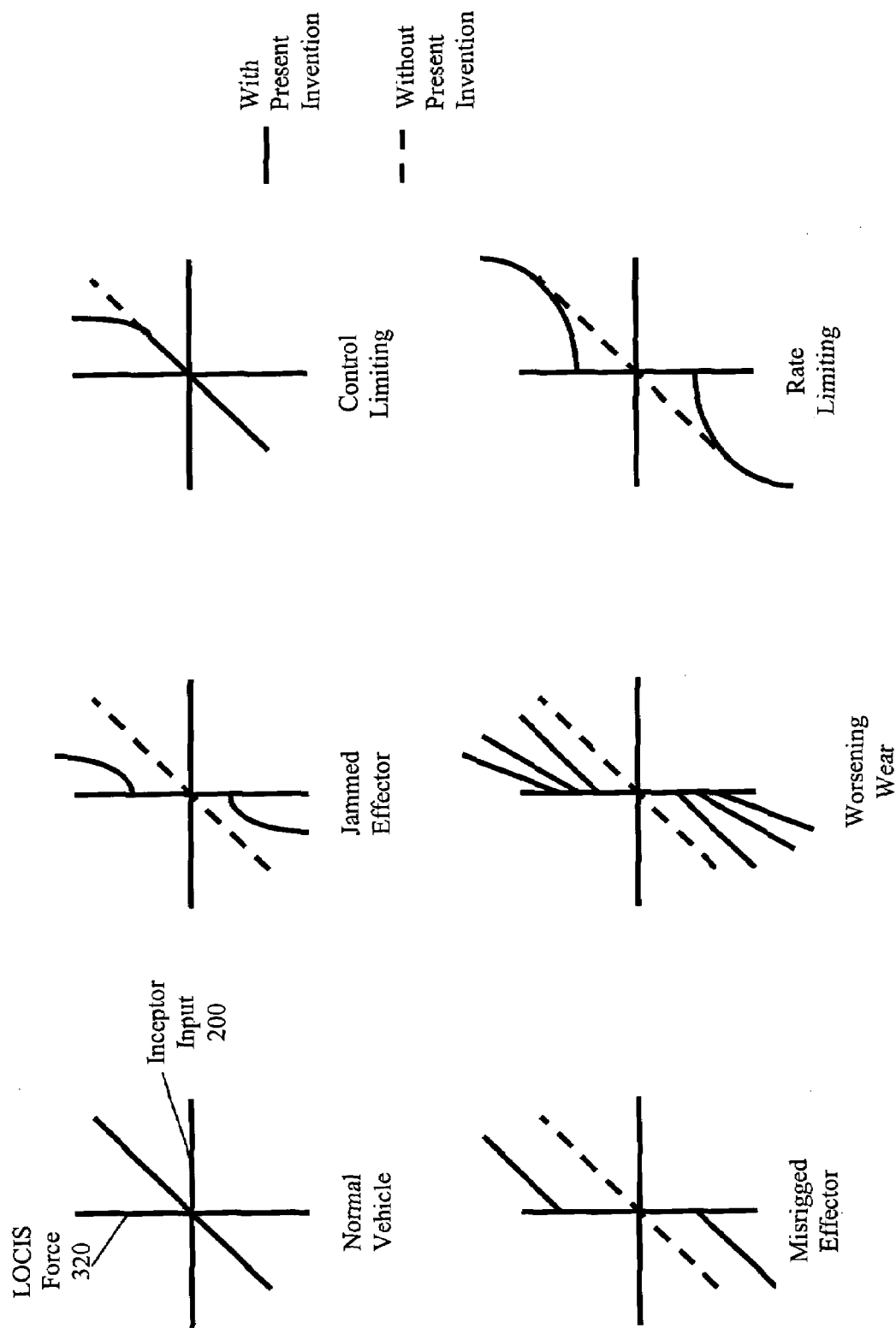
FIG. 3 shows inceptor/effector responses with and without a loss of control inhibitor system according to the present invention.

FIG. 3 shows inceptor/effector responses with and without a loss of control inhibitor system 100 according to the present invention. In the conditions shown, namely, a normal vehicle, a vehicle with a jammed effector, a vehicle with a control limiting function, a vehicle with a misrigged effector, a vehicle with worsening wear, and a vehicle with a rate limiting function, LOCIS force 320 is shown as a function of inceptor input 200. Without the present invention, LOCIS force 320 is directly proportional to inceptor position. With the present invention, LOCIS force 320 varies with each of the conditions, yet remains the same for a normally operating vehicle.

In various preferred embodiments, the vehicle having the present invention can be an aircraft, where the inceptor 130 is the aircraft yoke and or rudder pedals and the effector 185 is any one or combination of the control surfaces. In other various preferred embodiments, the vehicle having the present invention can be an automobile, where the inceptor 130 is the steering wheel and or the brake pedal and the effectors 185 are the vehicle wheels and brakes.

Figure 4:
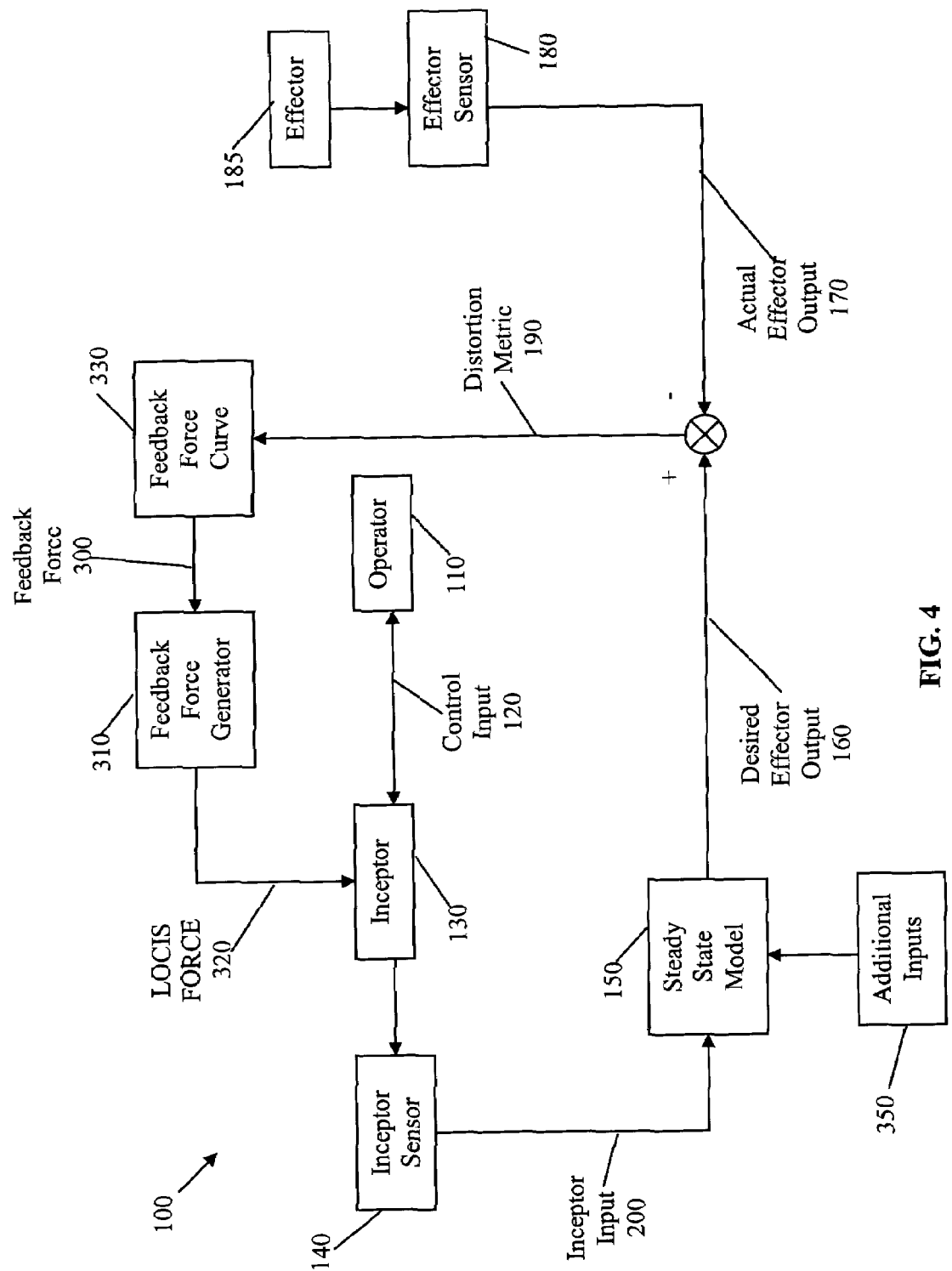
FIG. 4 shows a loss of control inhibitor system having additional inputs according to the present invention in block diagram form.

FIG. 4 shows a loss of control inhibitor system having additional inputs according to the present invention in block diagram form. In other various embodiments, the system 100 may be adapted to accommodate additional inputs 350 into the steady state model 150 that are used to determine the desired effector output 160. These additional inputs 350 may include, but are not limited to, stability augmentation, structural mode suppression, and/or disturbance alleviation. The distortion metric 190 can be derived from the actual effector output 170 compared to the desired effector output 160 from the steady state model 150 considering the inceptor input 200 and the additional inputs 350.

Figure 5:
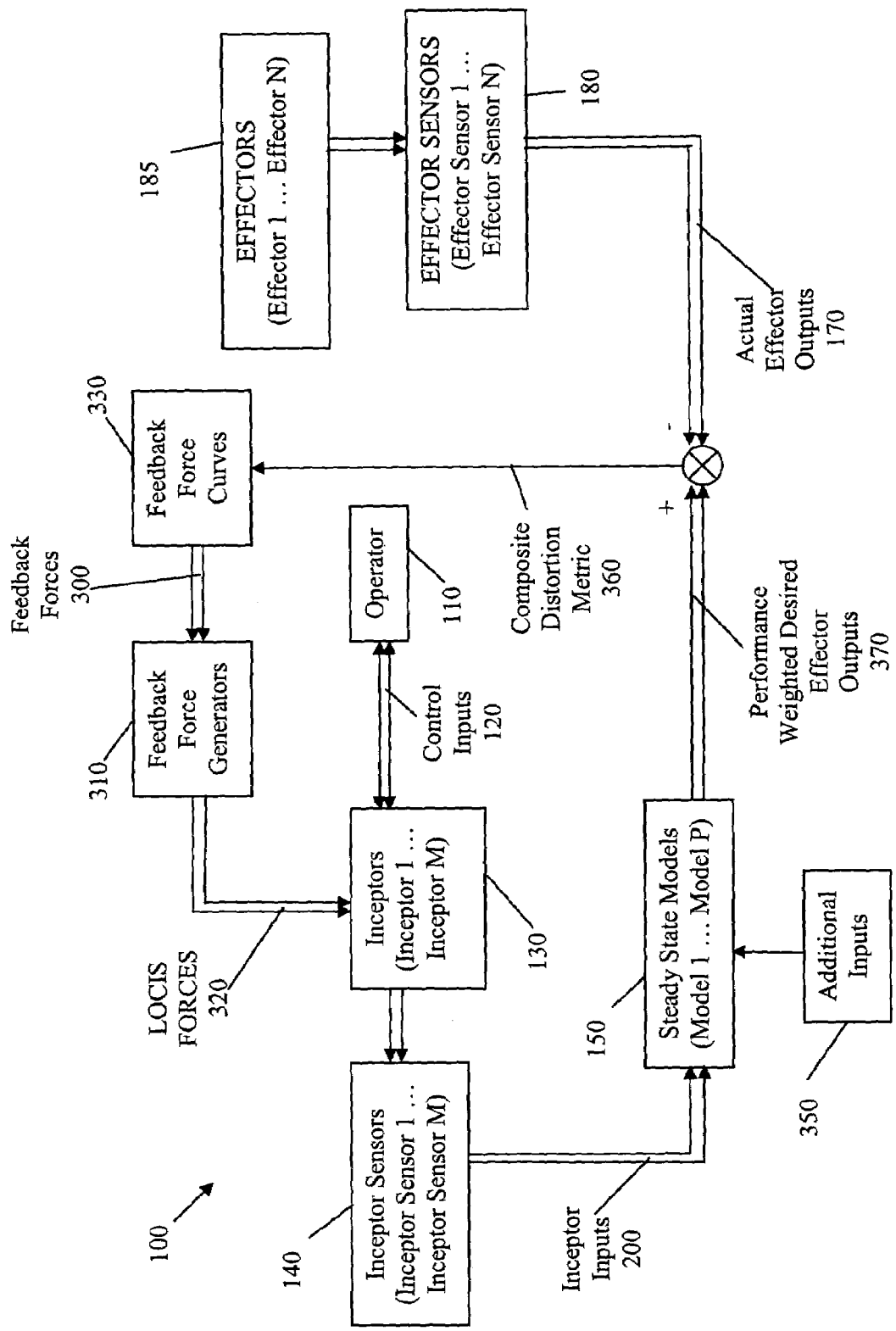
FIG. 5 shows a loss of control inhibitor system having multiple inceptors and multiple effectors according to the present invention in block diagram form.

FIG. 5 shows a loss of control inhibitor system having multiple inceptors and multiple effectors according to the present invention in block diagram form. In other various embodiments, model 150 may accommodate multiple inceptor inputs 200 (shown as Inceptor Inputs 1 . . . Inceptor Inputs M, where "M" is the number of inceptors), resulting in multiple desired effector outputs 170 (shown as Effector Output 1 . . . Effector Output N, where "N" is the number of effectors). This type of system may be seen in advanced military aircraft, where the flight control systems are adaptive and can reconfigure themselves to counter battle damage and control system failures. For example, an aircraft may lose the use of one elevator. The flight control system can recognize this and command additional movement of the other elevator and simultaneously command movement of other control surfaces to counteract flight parameters that are coupled to the additional elevator control. In these embodiments, each inceptor input 200 would be input to a steady state model 150 (shown as Model 1 . . . Model P, where "P" is the number of steady state models) for each of the effectors 185 involved in a particular control mode. A composite distortion metric 360 could be determined from, for example, a performance weighted desired effector output 370 based on each of steady state models 150. In this manner, the composite distortion metric 360 is analogous to the distortion metric 190 for a single effector case, discussed above.

While specific embodiments have been illustrated and described, numerous modifications come to mind without significantly departing from the spirit of the invention and the scope of protection is limited by the scope of the accompanying claims.

What is claimed as new and desired to be secured by Letters Patent of the United States is:

1. A loss of control inhibitor system for a vehicle, said system comprising:
   an inceptor for receiving a control input from an operator of said vehicle,
   an effector for effecting a control output in response to said control input from said operator of said vehicle,
   an inceptor sensor, wherein said inceptor sensor measures a value of said control input,
   an effector sensor, wherein said effector sensor measures an actual effector output of said effector,
   means for modeling a relationship between said control input and said control output for a predetermined range of conditions, said modeling means further receiving additional inputs related to said relationship wherein said modeling means produces a desired effector output from said control input and said additional inputs,
   means for determining a distortion metric, wherein said distortion metric comprises a difference between said desired effector output and said actual effector output, and
   means for providing a feedback force to said inceptor, wherein said feedback force is a function of said distortion metric.

2. The loss of control inhibitor system for a vehicle according to claim 1, wherein said inceptor sensor comprises a position transducer.

3. The loss of control inhibitor system for a vehicle according to claim 1, wherein said effector sensor comprises a position transducer.

4. The loss of control inhibitor system for a vehicle according to claim 1, wherein said value of said control input comprises an inceptor position.

5. The loss of control inhibitor system for a vehicle according to claim 1, wherein said value of said control input comprises an inceptor rate.

6. The loss of control inhibitor system for a vehicle according to claim 1, wherein said actual effector output comprises an actual effector position.

7. The loss of control inhibitor system for a vehicle according to claim 1, wherein said actual effector output comprises an actual effector rate.

8. The loss of control inhibitor system for a vehicle according to claim 1, wherein said vehicle is an aircraft.

9. The loss of control inhibitor system for a vehicle according to claim 8, wherein said inceptor is a yoke.

10. The loss of control inhibitor system for a vehicle according to claim 8, wherein said inceptor is a rudder pedal.

11. The loss of control inhibitor system for a vehicle according to claim 1, wherein said vehicle is an automobile.

12. The loss of control inhibitor system for a vehicle according to claim 11, wherein said inceptor is a steering wheel.

13. The toss of control inhibitor system for a vehicle according to claim 11, wherein said inceptor is a brake pedal.

14. The loss of control inhibitor system for a vehicle according to claim 13, wherein said effector is a brake.

15. A loss of control inhibitor system for a vehicle, said system comprising:
   a plurality of inceptors for receiving control inputs from an operator of said vehicle,
   a plurality of effectors for effecting control outputs in response to said control inputs from said operator of said vehicle,
   a plurality of inceptor sensors, wherein said inceptor sensors measure a plurality of values of said control inputs,
   a plurality of effector sensors, wherein said effector sensors measure a plurality of actual effector outputs of said effectors,
   a plurality of means for modeling a relationship between said control inputs and said control outputs for a predetermined range of conditions, said plurality of modeling means further receiving additional inputs related to said relationship wherein said plurality of modeling means produces a plurality of desired effector outputs from said control inputs and said additional inputs,
   means for determining a composite distortion metric, wherein said composite distortion metric comprises a difference between said desired effector outputs and said actual effector outputs, and means for providing a feedback force to each of said inceptors, wherein each said feedback force is a function of said composite distortion metric.

16. A method of inhibiting loss of control in a vehicle, said method comprising the steps of:
receiving a control input via an inceptor from an operator of said vehicle, effecting a control output via an effector in response to said control input from s measuring an actual effector output of said effector,
aid operator of said vehicle,
measuring a value of said control input,
receiving additional inputs related to control of said vehicle,
modeling a relationship between said control input, said additional inputs and said control output for a predetermined range of conditions,
producing a desired effector output from said control input and said additional inputs,
determining a distortion metric, wherein said distortion metric comprises a difference between said desired effector output and said actual effector output,
determining a feedback force as a function of said distortion metric, and
providing said feedback force to said inceptor.

17. The method of inhibiting loss of control in a vehicle according to claim 16, wherein measuring a value of said control input comprises measuring an inceptor position.

18. The method of inhibiting loss of control in a vehicle according to claim 16, wherein measuring a value of said control input comprises measuring an inceptor rate.

19. The method of inhibiting loss of control in a vehicle according to claim 16, wherein measuring an actual effector output comprises measuring an effector position.

20. The method of inhibiting loss of control in a vehicle according to claim 16, wherein measuring an actual effector output comprises measuring an effector rate.

21. A method of inhibiting loss of control in a vehicle, said method comprising the steps of:
receiving a plurality of control inputs via a plurality of inceptors from an operator of said vehicle,
effecting a plurality of control outputs via a plurality of effectors in response to said plurality of control inputs from said operator of said vehicle,
measuring a plurality of values of said plurality of control inputs,
measuring a plurality of actual effector outputs of said plurality of effectors,
receiving additional inputs related to control of said vehicle,
modeling a plurality of relationships between said plurality of control inputs, said additional inputs and said plurality of control outputs for a predetermined range of conditions,
producing a plurality of desired effector outputs from said plurality of control inputs and said additional inputs,
determining a composite distortion metric, wherein said composite distortion metric comprises a difference between said plurality of desired effector outputs and said plurality of actual effector outputs,
determining a plurality of feedback forces as a function of said composite distortion metric, and
providing said plurality of feedback forces to said plurality of inceptors.

* * * * *